US006947168B2

(12) United States Patent
Fujimoto et al.

(10) Patent No.: US 6,947,168 B2
(45) Date of Patent: Sep. 20, 2005

(54) WALL-MOUNTING IMAGE PROCESSING APPARATUS HAVING IMAGE-READING AND IMAGE-PRINTING FUNCTIONS

(75) Inventors: Hisayoshi Fujimoto, Kyoto (JP); Hiroaki Onishi, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 808 days.

(21) Appl. No.: 09/798,940

(22) Filed: Mar. 6, 2001

(65) Prior Publication Data

US 2001/0022661 A1 Sep. 20, 2001

(30) Foreign Application Priority Data

Mar. 7, 2000 (JP) ....................................... 2000-061414

(51) Int. Cl.[7] ............................ G06F 15/00; G06K 1/00

(52) U.S. Cl. ....................................... 358/1.18; 358/1.6

(58) Field of Search .................................. 358/1.1–1.18

(56) References Cited

U.S. PATENT DOCUMENTS 5,162,916 A 11/1992 Stemmle et al. ............ 358/296

5,997,194 A * 12/1999 Nunokawa et al. .... 400/120.01

FOREIGN PATENT DOCUMENTS

JP 6-319013 11/1994 .......... H04N/1/024

* cited by examiner

*Primary Examiner*—Douglas Tran

(74) *Attorney, Agent, or Firm*—Michael Bednarek; Pillsbury Winthrop Shaw Pittman LLP

(57) ABSTRACT

An image processing apparatus includes an image read/write head providing an image read line and including an image sensor for reading a document at the image read line, the image read/write head further including a substrate carrying a row of heating elements, a document transfer mechanism for transferring the document across the image read line, a recording paper transfer mechanism for transferring a recording paper across the row of heating elements, and an ink ribbon transfer mechanism for transferring an ink ribbon from a first winding core to a second winding core across the row of heating elements. The ink ribbon is sandwiched between the heating elements and the recording paper in passing across the row of heating elements. The first winding core is arranged on one side of the image read/write head thicknesswise of the substrate, the second winding core being arranged on an opposite side of the image read/write head thicknesswise of the substrate.

13 Claims, 9 Drawing Sheets

WALL-MOUNTING IMAGE PROCESSING APPARATUS HAVING IMAGE-READING AND IMAGE-PRINTING FUNCTIONS

BACKGROUND OF THE INVENTION

1. Field of the Invention

The present invention relates to a wall-mounting image processing apparatus having both an image reading function and an image printing function.

2. Description of the Related Art

A prior art image processing apparatus has such a structure as shown in FIG. 9, for example. The illustrated image processing apparatus includes a machine housing 2*e* in which an image read/write head Ae is accommodated. The machine housing 2*e* also accommodates a document D, a recording paper K, and an ink ribbon 9 capable of thermally transferring images, all of which are transferred along respective transfer paths within the housing 2*e*.

The image read/write head Ae, which serves as both a read head and a print head, includes an elongated head case 1*e*. The head case 1*e* accommodates a plurality of light sources 30*e* and a plurality of lenses 51*e*. Each of the light sources 30*e* and the lenses 51*e* is arranged in a respective row extending in a primary scanning direction, i.e. longitudinally of the case 1*e*. The head case 1e is provided with a transparent plate 19*e* which provides an image read line Se extending longitudinally of the case 1*e*. The head case 1*e* is provided, at the bottom thereof, with an elongated substrate 4*e* which has an obverse surface provided with a row of light receiving elements 3*e*. The substrate 4*e* also has a reverse surface provided with a row of heating elements 8*e*. Each of the rows of light receiving elements 3*e* and heating elements 8*e* extends in the primary scanning direction.

In the image processing having the above-described structure, the document D is transferred by a platen roller P3 to pass over and across the image read line Se so that an image of the document D is read line by line. On the other hand, a recording paper K is transferred by a platen roller P4 in close contact with the heating elements 8. During such transfer of the recording paper K, selected ones of the heating elements 8*e* generate heat, so that images are printed on the recording paper K line by line.

The image processing apparatus having the above-described structure can be made smaller than an image processing apparatus in which a read head and a print head are separately provided. Further, the use of an ink ribbon 9 makes it possible to use an ordinary paper as a recording paper K. This is advantageous, because if a thermosensitive paper is used as the recording paper K, there exist various problems that the printed image deteriorates in a relatively short time, for example.

However, the prior art image processing apparatus still has the following problems.

In the prior art apparatus, a pair of winding cores 90*a*, 90*b* for the ink ribbon 9 are arranged in the machine housing 2*e* in such a manner that they are spaced from each other in a plane which is roughly parallel to the reverse surface of the substrate 4. Further, both of the cores 90*a*, 90*b* are located on one side of the substrate 4*e*, as viewed thicknesswise of the substrate 4*e*. With this arrangement, it is possible to smoothly transfer the ink ribbon 9 along the reverse surface of the substrate 4*e*.

With this structure, however, if the image read/write head Ae has a relatively large thickness or height H (the distance between the image read line Se and the heating elements 8*e*), the image processing apparatus becomes correspondingly bulky. This is because the thickness or height of the image read/write head Ae is entirely additional to the thickness or height of the image processing apparatus as a whole.

On the other hand, there is a higher need for overall thickness reduction of the image processing apparatus, particularly, for using the image processing apparatus as a wall-mounting type facsimile machine for example. However, such a thickness reduction is not possible in the above-described prior art.

SUMMARY OF THE INVENTION

It is therefore an object of the present invention to provide an image processing apparatus which has both an image reading function and an image printing and which yet has a relatively small overall thickness.

According to a first aspect of the present invention, there is provided an image processing apparatus which comprises an image read/write head providing an image read line and including an image sensor for reading a document at the image read line, the image read/write head further including a substrate carrying a row of heating elements, a document transfer mechanism for transferring the document across the image read line, a recording paper transfer mechanism for transferring a recording paper across the row of heating elements, and an ink ribbon transfer mechanism for transferring an ink ribbon from a first winding core to a second winding core across the row of heating elements. The ink ribbon being sandwiched between the heating elements and the recording paper in passing across the row of heating elements. The first winding core is arranged on one side of the image read/write head thicknesswise of the substrate, the second winding core being arranged on an opposite side of the image read/write head thicknesswise of the substrate.

Preferably, the recording paper transfer mechanism and the ink ribbon transfer mechanism transfer the recording paper and the ink ribbon, respectively, partially thicknesswise of the substrate and partially widthwise of the substrate.

Preferably, the image read/write head may include a guide portion for guiding the document toward the image read line.

Preferably, the first and second cores of the ink ribbon transfer mechanism overlaps the image read/write head widthwise of the substrate.

Preferably, the recording paper is paid out from a roll thereof, in which case the roll is disposed behind the first core of the ink ribbon transfer mechanism and overlaps the image read/write head widthwise of the substrate.

Preferably, the recording paper transfer mechanism includes a platen roller for transferring the recording paper in facing relationship to the row of heating elements. In this case, it is advantageous if the recording paper paid out from the roll is wound on the platen roller in a direction opposite to a direction in which the recording paper is initially wound on the roll.

In one embodiment of the present invention, the ink ribbon is a color ink ribbon including different kinds of color regions, wherein each of the color regions has a region width shorter than a length of a standard paper size which is determined based on a width of the ink ribbon.

Preferably, the region width of each color region is equal to a quotient obtained by dividing the length of the standard paper size by an integer no less than 2. Alternatively, the region width of each color region may be set equal to a sum of the above-mentioned quotient and a predetermined excess.

Preferably, the image processing apparatus further comprises at least one light source for illuminating the document at the image read line. In this case, the light source, the image sensor and the heating elements are mounted on a common surface of the substrate.

Preferably, the image processing apparatus further comprises a housing for accommodating the image read/write head, the document transfer mechanism, the recording paper transfer mechanism, the ink ribbon transfer mechanism and the recording paper, wherein the housing is provided with mounting means for mounting the housing onto a substantially vertical wall surface.

Preferably, the housing includes a base portion and a cover pivotally connected to the base portion. In this case, the image read/write head, the document transfer mechanism and the ink ribbon transfer mechanism are mounted on the cover of the housing, whereas the recording paper transfer mechanism and the recording paper are mounted on the base portion of the housing.

According to a second aspect of the present invention, there is provided an image processing apparatus comprising an image read/write head providing an image read line and including an image sensor for reading a document at the image read line, the image read/write head further including an elongated substrate carrying a row of heating elements, a document transfer mechanism for transferring the document across the image read line, a recording paper transfer mechanism for transferring a recording paper across the row of heating elements, an ink ribbon transfer mechanism for transferring an ink ribbon from a first winding core to a second winding core across the row of heating elements, the ink ribbon being sandwiched between the heating elements and the recording paper in passing across the row of heating elements, and a housing for accommodating the image read/write head, the document transfer mechanism, the recording paper transfer mechanism and the ink ribbon transfer mechanism. The housing is mounted on a support surface. The image read/write head is disposed in the housing in such a manner that a widthwise direction of the substrate extends perpendicularly to the support surface.

Other features and advantages of the present invention will become clearer from the detailed description given below with reference to the accompanying drawings.

DETAILED DESCRIPTION OF THE PREFERRED EMBODIMENTS

Preferred embodiments of the present invention will be described below in detail with reference to the accompanying drawings.

Figure 1:
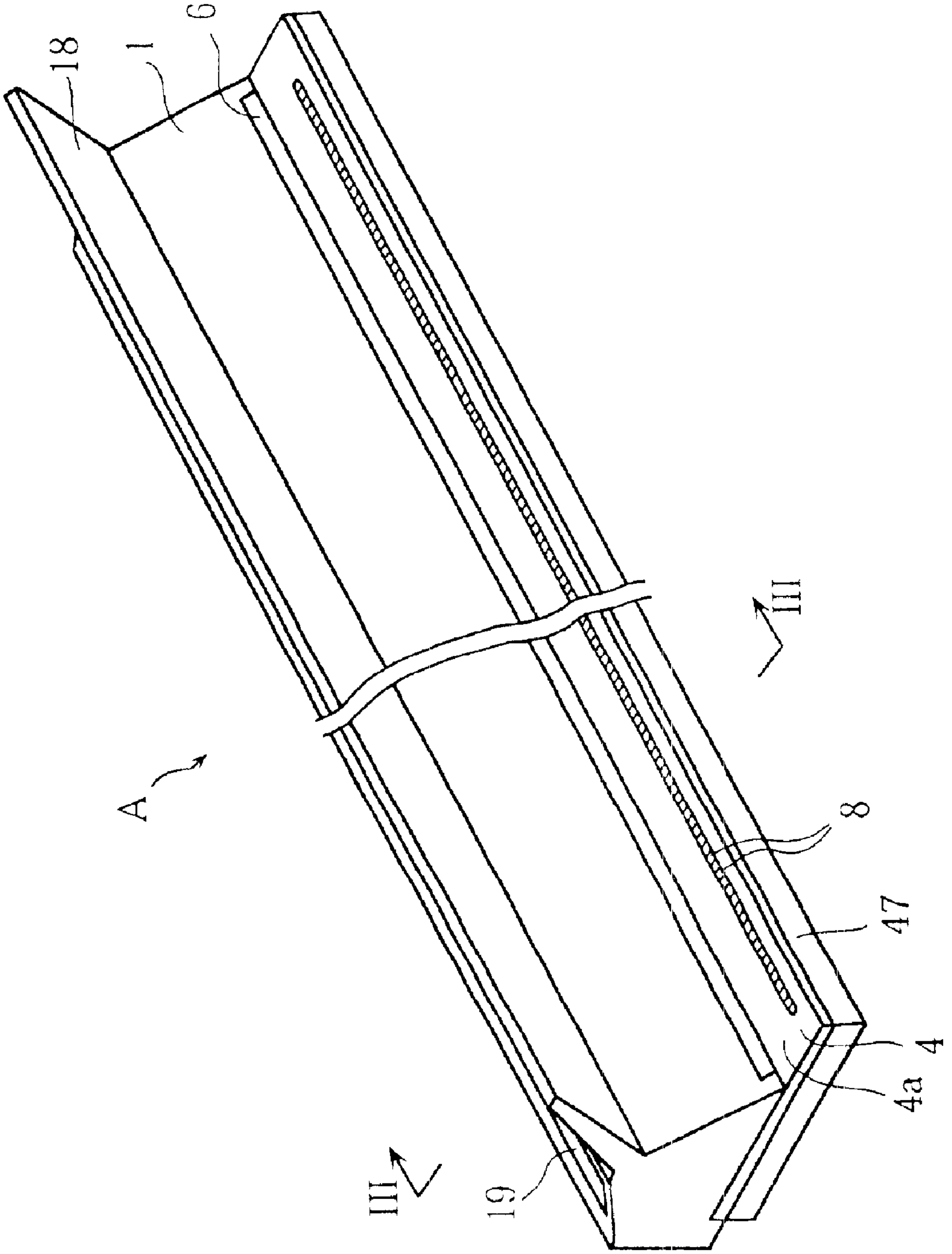
FIG. 1 is a perspective view showing an image read/write head used in an image processing apparatus in accordance with the present invention.
Figure 2:
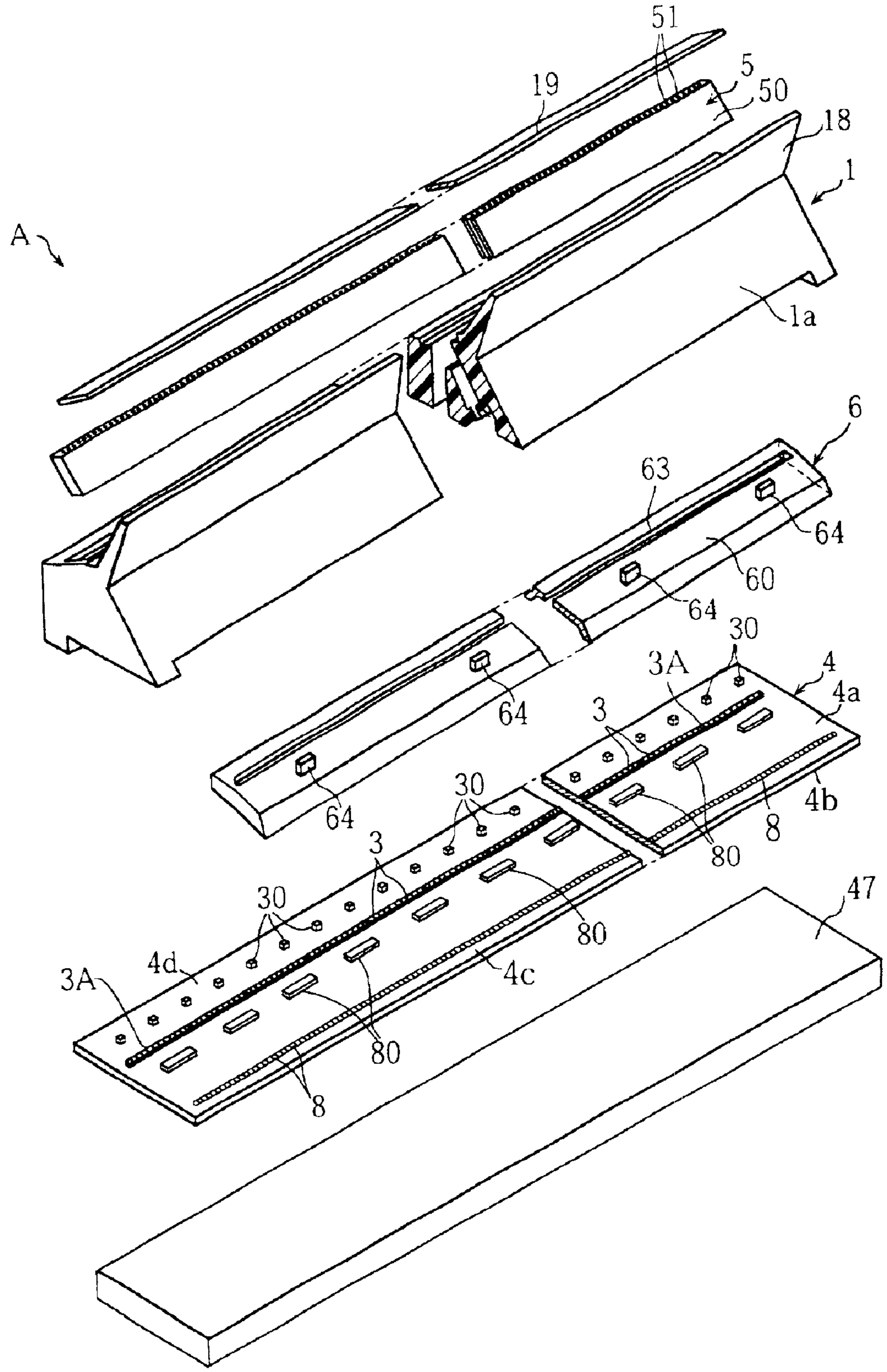
FIG. 2 is an exploded perspective view of the image read/write head shown in FIG. 1.
Figure 3:
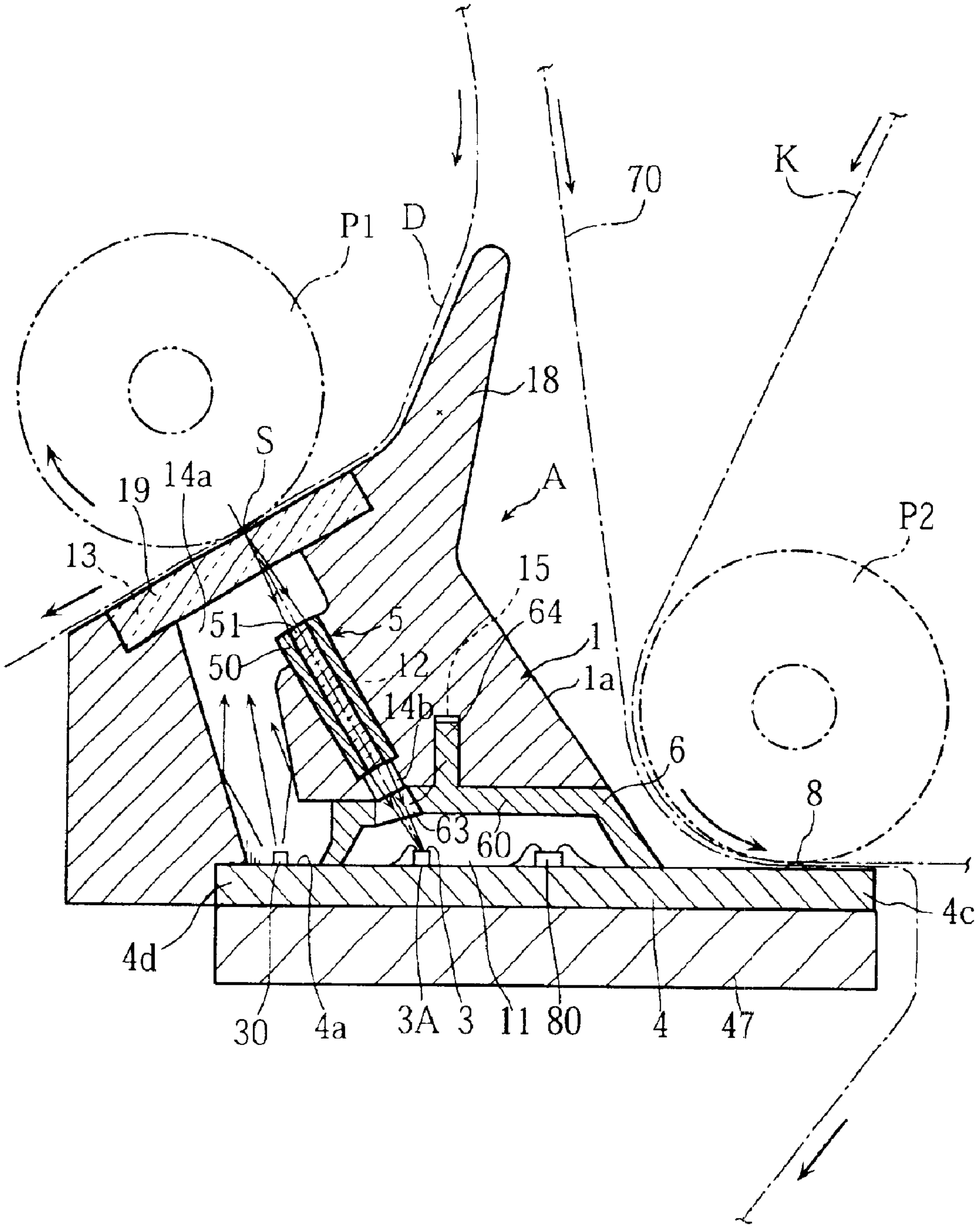
FIG. 3 is a sectional view taken along lines III—III in FIG. 1.

FIGS. 1 through 3 illustrate an image read/write head A incorporated in an image processing apparatus B in accordance with the present invention. Specifically, as clearly shown in FIGS. 2 and 3, the image read/write head A comprises a head case 1, a substrate 4, a lens array 5, a reflection preventing member 6, a transparent plate 19, a heat sink plate 47 and other parts which will be described below.

The substrate 4, which may be made of ceramic material for example, is in the form of an elongated rectangular plate. The substrate 4 has an obverse surface 4*a* which is provided with a plurality of light receiving elements 3, a plurality of heating elements 8, a plurality of light sources 30 and a plurality of drive IC chips 80.

The plurality of light sources 30, each of which may comprise an LED chip, are arranged on the substrate 4 at a predetermined pitch in a row extending longitudinally of the substrate. Each of the light sources 30 is so arranged as to successively emit red light, green light and blue light. Each of the light receiving elements 3 for performing photoelectric conversion is integrally built in a sensor IC chip 3A which is a rectangular semiconductor chip. The sensor IC chips 3A, or the light receiving elements 3 are arranged in a row extending substantially parallel to the row of the light sources 30. The heating elements 8 may be similar in structure to those used for a prior art thermal printhead. The heating elements 8 may be provided by printing resistor paste in a thick film and then baking the paste to form a linear heating resistor extending longitudinally of the substrate 4. The resistor paste may contain, for example, ruthenium oxide as a conductive substance. An electrode (not shown) is formed on the substrate 4 to electrically divide the heating resistor longitudinally at a predetermined pitch.

The drive IC chips 80 incorporate driving circuits for controlling the heating operation of the heating elements 8. Similarly to the light sources 30, the drive IC chips 80 are arranged at a predetermined pitch in a row extending longitudinally of the substrate 4.

The row of heating elements 8 is disposed on the substrate 4 at a portion which is offset widthwise toward a first longitudinal side 4*c* of the substrate 4, whereas the rows of the drive IC chips 80, the light receiving elements 3 and the light sources 30, respectively, are disposed at a portion which is widthwise closer to a second longitudinal side 4*d* of the substrate 4 than the row of heating elements 8.

The obverse surface 4*a* of the substrate 4 is formed with a non-illustrated wiring pattern including the above electrode pattern connected to the above-described components. The substrate 4 is also provided with at least one connector (not shown) which is electrically connected to the wiring pattern. By connecting an external device to the connector by wiring, it is possible to supply power from the external device to the above-described components while performing input/output of various signals to and from the components.

The heat sink plate 47, which may be made of metal having high heat conductivity, functions to dissipate heat generated from the heating elements 8. The heat sink plate 47 may be in the form of a plate which is substantially equal in size to the substrate 4. The heat sink plate 47 may be bonded to the reverse surface 4*b* of the substrate 4 with a double-sided adhesive tape or an adhesive.

The head case 1, which may be made of white synthetic resin, is elongated similarly to the substrate 4. The head case 1 is mounted on the obverse surface 4*a* of the substrate 4 to cover a portion of the substrate 4 while avoiding the heating elements 8. The head case 1 may be mounted on the substrate 4 by bringing the case 1 into engagement with the substrate 4, by clamping these components with a spring clip or clips, or by bonding these components with an adhesive, for example. The head case 1 is provided with an upwardly projecting guide portion 18 extending longitudinally of the head case 1 for guiding a document toward an image read line S, which will be described later.

The transparent plate 19 may be made of glass material or synthetic resin having high transparency. The head case 1 has an upper surface which is formed with a recess 13 into which the transparent plate 19 is fitted so as to face the obverse surface 4*a* of the substrate 4 as spaced away therefrom. The upper surface of the head case 1 as well as the transparent plate 19 fitted thereto are inclined. Specifically, the transparent plate 19 is so inclined, relative to the substrate 4, that the spacing from the substrate 4 reduces as it extends farther from the first longitudinal side 4*c* of the substrate 4. Such an inclination of the transparent plate 19 is helpful for smooth transfer of the document D.

The head case 1 has an inclined side surface la rising obliquely from the obverse surface of the substrate 4 toward the transparent plate 19. Such an inclination of the side surface la is useful for disposing a platen roller P2 beside the head case 1 in a space-efficient manner and for transferring a recording paper K and an ink ribbon 70 smoothly.

The lens array 5 comprises a plurality of lenses 51 arranged in a row and held in an elongated lens holder 50 formed of synthetic resin. Each of the lenses 51 may be a selfoc (self-focusing) lens which is capable of forming a non-inverted, non-magnified image of the document D on each of the light receiving elements 3. However, other lenses may be employed for the present invention. The lens array 5 is built in the head case 1 as fitted into a groove 12 formed in the head case 1 in facing relationship to the transparent plate 19. A portion on the transparent plate 19 positionally corresponding to the lens array 51 serves as an image read line S.

A first and a second light paths 14*a*, 14*b* for guiding light emitted from the light sources 30 are defined in the head case 1. The first light path 14*a*, which extends over the height of the head case 1, is provided for guiding light emitted from the light sources 30 to the image read line S. The second light path 14*b*, which includes the groove 12, is provided for guiding the light reflected by the document on the image read line S to the light receiving elements 3 via the lenses 51. Since the head case 1 is made of white synthetic resin as described before, the light emitted from the light sources 30 is guided to the image read line S while being repetitively reflected on the white wall surfaces of the first light path 14*a* with high reflectivity. Therefore, the image read line S can be illuminated efficiently.

The reflection preventing member 6 may be made of synthetic resin such as polycarbonate or ABS resin containing black pigment or glass powder, for example, and has a black surface to provide high light absorption. The reflection preventing member 6 is disposed in a recess 11 formed at the bottom of the head case 1 in such a manner as to surround the sensor IC chips 3A and the drive IC chips 80. The reflection preventing member 6 includes an upper wall 60 which is formed with a slit 63 for allowing the second light path 14*b* to extend therethrough. The upper wall is further provided with a plurality of projections 64 for insertion into a plurality of deeper recesses 15 formed in the head case 1. The reflection preventing member 6 is thus mounted to the head case 1. By surrounding the sensor IC chips 3A by the reflection preventing member 6, it is possible to prevent the light reflected on the document D from being affected by the white walls of the recess 11 and from being scattered around the light receiving elements 3. Therefore, scattered light, which may cause noises, is prevented from reaching the light receiving elements 3. Further, the reflection preventing member 6 also prevents light emitted from the light sources from traveling directly toward the light receiving elements 3. The reflection preventing member 6 also blocks light from outside the head case 1.

Next, the structure of an image processing apparatus in accordance with the present invention will be described with reference to FIGS. 4 and 5. The image processing apparatus B in this embodiment is designed as a wall-mounting type facsimile machine. As clearly shown in FIG. 4, the image processing apparatus B generally comprises the above-described image read/write head A, two platen rollers P1, P2, a cutter 89, and a machine housing 2 for accommodating the above-described components. The machine housing 2 internally provides an ink ribbon transferring section 7 for receiving and transferring an ink ribbon and a paper roll receiving section for receiving a roll R of a recording paper K.

Figure 4:
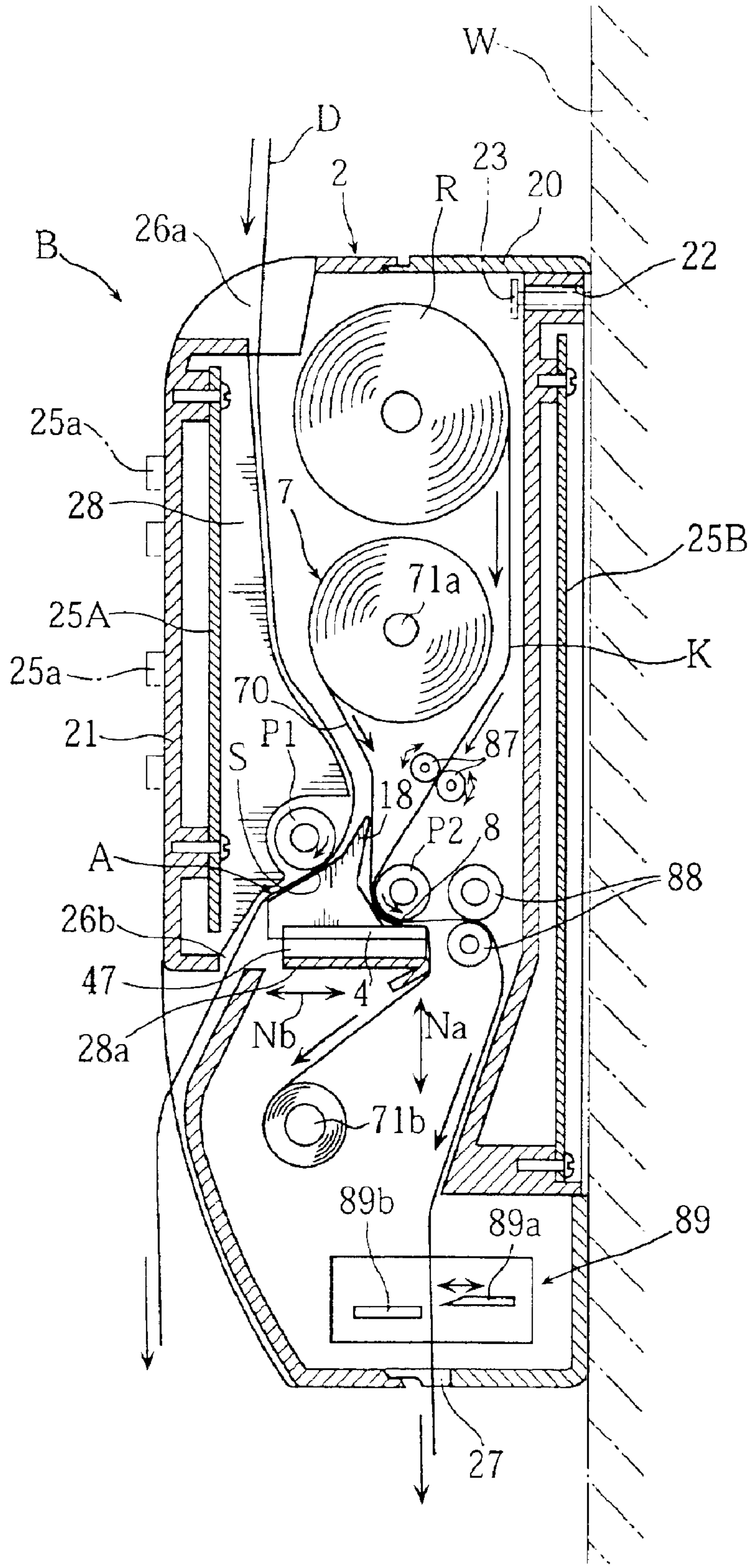
FIG. 4 is a sectional view showing an image processing apparatus in accordance with the present invention.

Unless otherwise specified, the positions of the various components of the image processing apparatus B refer to those when the apparatus is mounted in the FIG. 4 state.

The machine housing 2, which is made of synthetic resin for example, comprises a base portion 20, and a front cover 21. The front cover 21 is provided with a guide plate 28 for guiding the document D.

The base portion 20 is in the form of a box which is open at the front. The base portion 20 is formed with at least one engaging hole 22 extending through the rear surface thereof. The engaging hole 22 is an example of mounting means in the claimed invention. The image processing apparatus B may be mounted onto the wall surface W by bringing a catch 23 fixed to the wall surface W into engagement with the engaging hole 22. However, the image processing apparatus B may be mounted to the wall surface W by other means.

Figure 5:
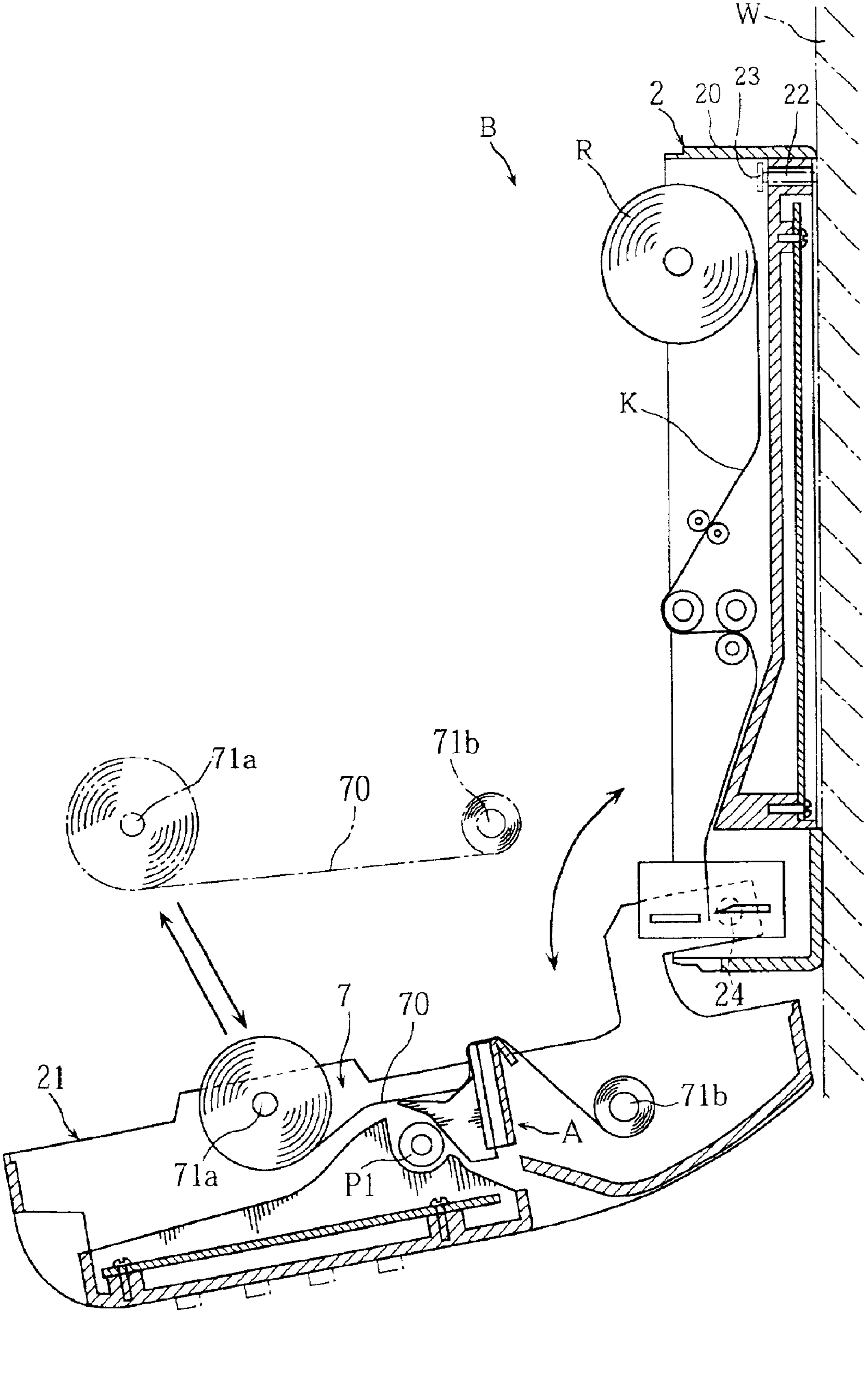
FIG. 5 is a sectional view showing the image processing apparatus shown in FIG. 4 with the front cover opened.

As shown in FIG. 5, the front cover 21 is attached to the base portion 20 via a shaft 24 so that the front cover 21 is pivotally movable about the shaft 24 for opening and closing the machine housing 2. As shown in FIG. 4, the front cover 21 is provided with various kinds of operation switches 25*a* and a display portion (not shown) such as a liquid crystal panel.

The machine housing 2 further incorporates two circuit boards 25A, 25B which constitute control circuits for performing signal control with respect to the operation switches 25*a* and the display portion, and other various signal control and operation control. The machine housing 2 further includes a document inserting port 26*a* formed at an upper portion and a document discharging port 26*b* formed at the front, as well as a recording paper discharging port 27 formed at a lower portion.

The image read/write head A is fixedly mounted to the front cover 21 so that substrate 4 extends horizontally along the wall surface W in the machine housing 2. The widthwise direction of the substrate 4 is indicated by an arrow Nb in FIG. 4. The image read/write head A may be fixed to the front cover 21 by bonding the heat sink plate 47 onto a support member 28*a* which is made of metal and fixed to the front cover 21 for example. The platen roller P1 is mounted to the front cover 21 in facing relationship to the transparent plate 19 (FIG. 3) of the image read/write head A.

In the image processing apparatus B, the document D is inserted in the machine housing 2 through the document inserting port 26*a*. The document D is then transferred downwardly, by a non-illustrated transfer roller, along the guide plate 28 and then along the guide portion 18 to a portion between the platen roller P1 and the transparent plate 19 of the image read/write head A. The document D is then transferred to a document discharging port 26*b* by the rotation of the platen roller P1. The transfer mechanism comprising the transfer roller, the platen roller P1, the guide plate 28 and the guide portion 18 is an example of document transfer means in the claimed invention. However, other transfer means may be employed in the present invention. This holds true with respect to the recording paper transfer means and the ink ribbon transfer means which will be described later.

The platen roller P2 is mounted to the base portion 20 of the machine housing 2 in facing relationship to the heating elements 8 of the image read/write head A. The platen roller P2 functions to transfer the ink ribbon 70 and the recording paper K in close contact with the heating elements 8.

The ink ribbon 70 capable of thermally transferring images is wounded around a pair of winding cores 71*a*, 71*b* and disposed in the ink ribbon transferring section 7. The ink ribbon 70 is transferred along a predetermined path within the transferring section 7. The winding cores 71*a*, 71*b* are removably mounted to the front cover 21 of the machine housing 2 (See FIG. 5) Thus, the ink ribbon 70 is upwardly removable with the front cover 21 opened. In the present invention, a so-called cassette type ink ribbon may be employed in which the ink ribbon 70 and the winding cores 71*a*, 71*b* are accommodated together in a cassette case made of e.g. synthetic resin.

As clearly shown in FIG. 4, the winding cores 71*a*, 71*b* are spaced from each other so as to sandwich the image read/write head A in the thickness direction of the substrate 4, i.e. in a direction indicated by an arrow Na. The winding cores 71*a*, 71*b* are made rotatable within the ink ribbon transferring section 7 so that the ink ribbon 70 initially wound around the core 71*a* is paid out downwardly to pass between the platen roller P2 and the heating elements 8 and then wound up around the winding core 71*b*.

Figure 6:
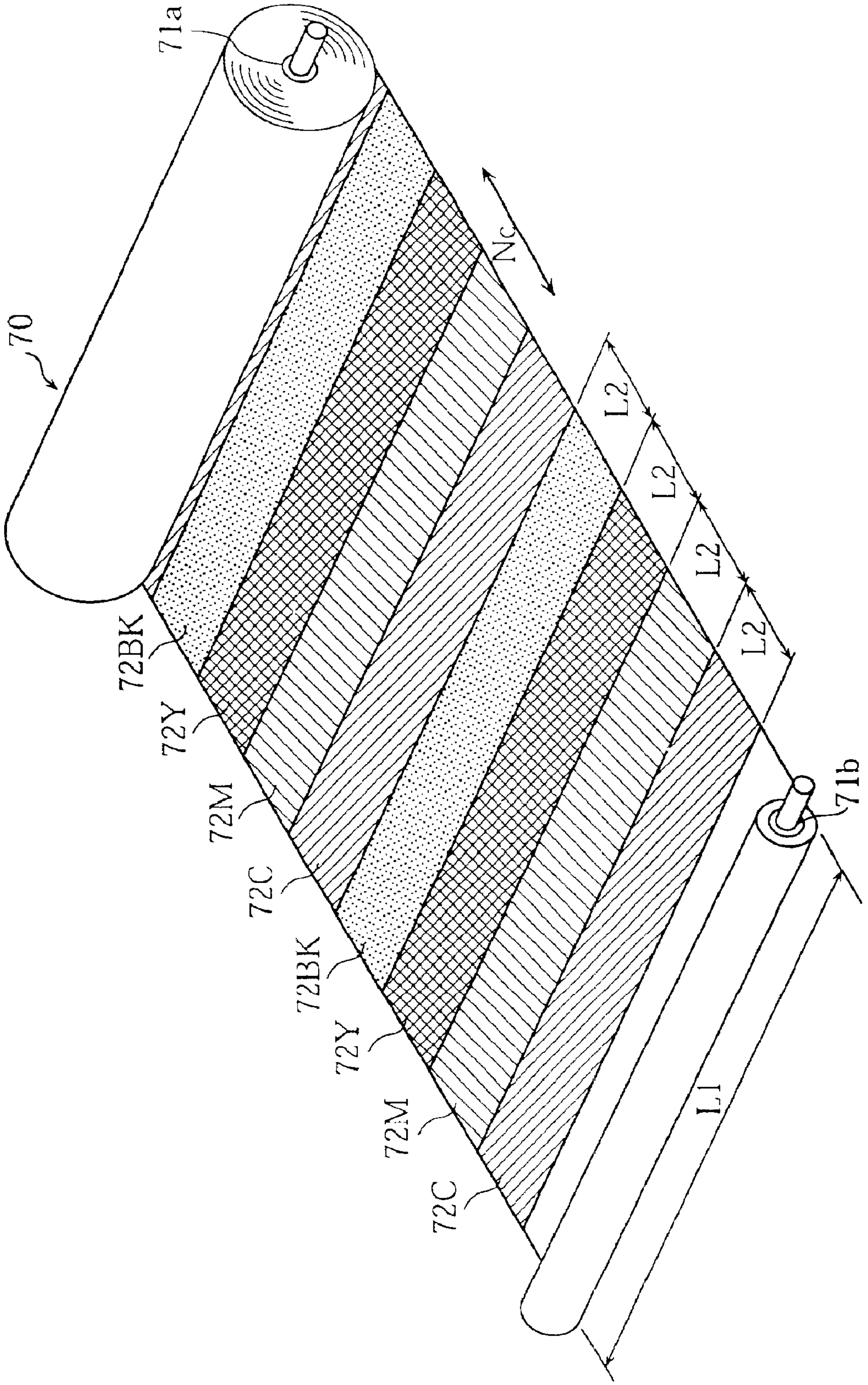
FIG. 6 is a perspective view of an ink ribbon.

The ink ribbon 70 is an elongated color ink ribbon capable of thermally transferring color images on the recording paper K. Specifically, as shown in FIG. 6, the ink ribbon 70 includes four kinds of color regions comprising cyan regions 72C, magenta regions 72M, yellow regions 72Y and black regions 72Bk each of which extends widthwise of the ink ribbon 70. These color regions are repetitively provided in a predetermined order over the length of the ink ribbon 70. However, for performing color image printing, the black region 72Bk may be dispensed with.

The ink ribbon 70 may have a width L1 which is substantially equal to the width of a standard A4-size (210 mm). The four color regions are equal in pitch L2, which is obtained by dividing the length (297 mm) of a standard A4-size by an integer no less than 2 and adding thereto an excess of several millimeters. Thus, the pitch L2 is smaller than 297 mm. In this embodiment, the pitch L2 is one eighth of the length of a standard A4 size to which an excess of several millimeters is added.

Returning to FIGS. 4 and 5, the paper roll R is provided by winding an elongated recording paper K which has a width corresponding to that of the standard A4 size. The recording paper K may be an ordinary paper (non-thermosensitive paper). The paper roll R is disposed in the machine housing 2 above the ink ribbon transferring section 7 so as to overlap the ink ribbon transferring section 7 in the thickness direction of the machine housing 2, i.e. in the arrow Nb direction. Specifically, the axis of the paper roll R and the axis of the winding core 71*a* are aligned on a vertical line. Further, the paper roll R is removably mounted in the base portion 20 of the machine housing 2 so as to be replaced with another paper roll when the front cover 21 is opened (See FIG. 5), but the paper roll R is prevented from being unintentionally detached from the machine housing 2.

The recording paper K is paid out from the paper roll R by a non-illustrated pay-out roller and is then transferred by a pair of transfer rollers 87 to the position between the platen roller P2 and the plurality of heating elements 8. Subsequently, the recording paper K passes between a pair of transfer rollers 88 to be transferred to the cutter 89. Thus, both the ink ribbon 70 and the recording paper K pass between the platen roller P2 and the heating elements 8. At that time, the ink ribbon 70 is transferred while being sandwiched between the heating elements 8 and the recording paper K. The transfer mechanism comprising the pay-out roller, the transfer rollers 87, 88 and the platen roller P2 is an example of recording paper transfer means in the claimed invention. In this transfer mechanism, the recording paper K is wound about the platen roller P2 in a direction which is opposite from the winding direction of the paper roll R. This helps to remove or reduce the tendency of the recording paper K to curl due to its initial winding on the roll R. The transfer roller 87 is reversely rotatable for transferring the recording paper K between the platen roller P2 and the heating elements 8 upwardly to return toward the roll R.

The cutter 89 cuts the recording paper K transferred thereto after passing between the pair of transfer rollers 88. The cutter 89 may comprise a pair of slidable cutter blades 89*a*, 89*b* or a rotary cutter for example. The cutter 89 can be dispensed with in which case the user cuts the recording paper K manually. The recording paper K passed over the cutter 89 is discharged downwardly from the machine housing 2 through the recording paper discharge port 27.

In this image processing apparatus B, the winding cores 71*a*, 71*b* are above and below the image read/write head A so that the ink ribbon 70 is transferred toward the platen roller P2 in the thickness direction of the substrate 4. Similarly, the recording paper K is transferred toward the platen roller P2 in the thickness direction of the substrate 4. Therefore, at or adjacent the platen roller P2, the respective transfer paths of the ink ribbon 70 and the recording paper K are located close to the transfer path of the document D in the thickness direction of the machine housing 2. In other words, in the image processing apparatus B, the respective transfer paths of the ink ribbon 70, the recording paper K and the document D do not extend much in the widthwise direction nor in the thickness direction of the image read/write head A. As a result, it is possible to reduce the thickness of the machine housing 2.

Moreover, in the image processing apparatus B, the document D, the ink ribbon 70 and the recording paper K are transferred downwardly within the machine housing 2 generally in the same direction. Therefore, these three elements are prevented from interfering with each other. Further, in the illustrated embodiment, the paper roll R of the recording paper K is arranged above the ink ribbon transferring section 7 in the machine housing 2. This prevents the combination of the paper roll R and the ink ribbon transferring section 7 from being bulky in the thickness direction of the machine housing 2.

With the image processing apparatus B, image reading of the document D is performed as follows.

First, as shown in FIG. 3, the document D is transferred by the platen roller P1 onto the image read line S on the transparent plate 19. In this state, the document D is illuminated with light emitted from the light sources 30. The light is reflected on the document D to travel toward the light receiving elements 3, each of which outputs signals corresponding to the received amount of light.

On the other hand, printing of a color image on the recording paper K is performed as follows.

The ink ribbon 70 as shown in FIG. 6 is transferred forward so that the four kinds of color regions, 72C, 72M, 72Y, 72Bk pass over the heating elements 8 in a predetermined order, whereas the recording paper K is transferred alternately forward and backward. For example, the recording paper K is firstly transferred forward together with the ink ribbon 70 while image printing using the cyan region 72C is performed. When the printing for the cyan is finished, the recording paper K is transferred backward by a predetermined amount by the reverse rotation of the transfer rollers 87. Then, the recording paper K is again transferred forward together with the ink ribbon 70. At this time, printing using the magenta region 72M is performed over the cyan image on the recording paper K. Similarly thereafter, image printing using the yellow region 72Y and the black region 72Bk are performed while repetitively transferring the recording paper K alternately forward and backward. Thus, a complete color image can be printed.

As described above, the pitch L2 of each color region 72C, 72M, 72Y, 72Bk in this embodiment is one eighth of the length of a standard A4 size plus an excess of several millimeters. Therefore, when printing is performed once with respect to each of the four colors, a color image of one eighth of the A4 size length is provided. Accordingly, for printing a color image of one half of the A4 size length, the color printing is performed four times with respect to each of the four colors. In this case, therefore, the total length of each color region necessary for printing is only one half of the A4 size length. By contrast, in a prior art apparatus, the pitch L2 of each color region 72C, 72M, 72Y, 72Bk is made equal or substantially equal to the length of the standard A4 size length. In this case, therefore, even if a color image of one half of the A4 size length is printed, the length of each color region actually consumed for the printing becomes substantially equal to the A4 size length. According to the illustrated embodiment, the ink ribbon 70 can be saved in the case where a color image shorter than the A4 size length is printed.

In printing an image of the full A4 size, printing using the color regions needs to be performed eight times with respect to each color. In this case, eight cyan regions 72C, eight magenta regions 72M, eight yellow regions 72Y, and eight black regions 72Bk are completely used without leaving unused portion in each color region. Therefore, also in this case, it is possible to use the ink ribbon 70 efficiently.

In the present embodiment, the pitch of each color region 72*c*, 72M, 72Y, 72Bk need not necessarily be one eighth of the A4 size length plus an excess, but may be set otherwise. If only the pitch L2 is made shorter than the length of a standard size such as A4 or B4 which is determined based on the width of the ink ribbon, it is possible to save the ribbon 70 when printing an image shorter than the length of the standard size. However, it is more advantageous to set the pitch L2 to one eighth of the length of a standard A4 size plus an excess of several millimeters, because, in that case, the ink ribbon can be efficiently used also in printing the full size image as described above.

In the image read/write head A used in the image processing apparatus B, the sensor IC chips 3A, the heating elements 8, the drive IC chips 80 as well as the wiring pattern including the electrode pattern are provided on the same surface 4*a* of the substrate 4. Therefore, the mounting of these components and the provision of the wiring pattern can be easily performed without turning over the substrate 4, which facilitates production of the apparatus.

Further, the reflection preventing member 6 is provided so as to accommodate the sensor IC chips 3A and the drive IC chips 80 together in a common space. In other words, the reflection preventing member 6 has no partition wall separating the sensor IC chips 3A and the drive IC chips 80. Therefore, it is possible to reduce the space between the row of sensor IC chips 3A and the row of drive IC chips 80. If the sensor IC chips 3A and the drive IC chips 80 are partitioned by the reflection preventing member 6, there is a possibility that the reflection preventing member 6 undesirably contacts these components or the wires bonded thereto, which is unlikely to occur in the present embodiment.

Moreover, since the image read/write head A is provided with the guide portion 18 for guiding the document D, an additional guiding member which is separate from the image read/write head A need not be provided. This facilitates the manufacturing of the image processing apparatus B.

The specific structure of each component of the image processing apparatus is not limitative on the present invention but may be modified in various ways.

Figure 7:
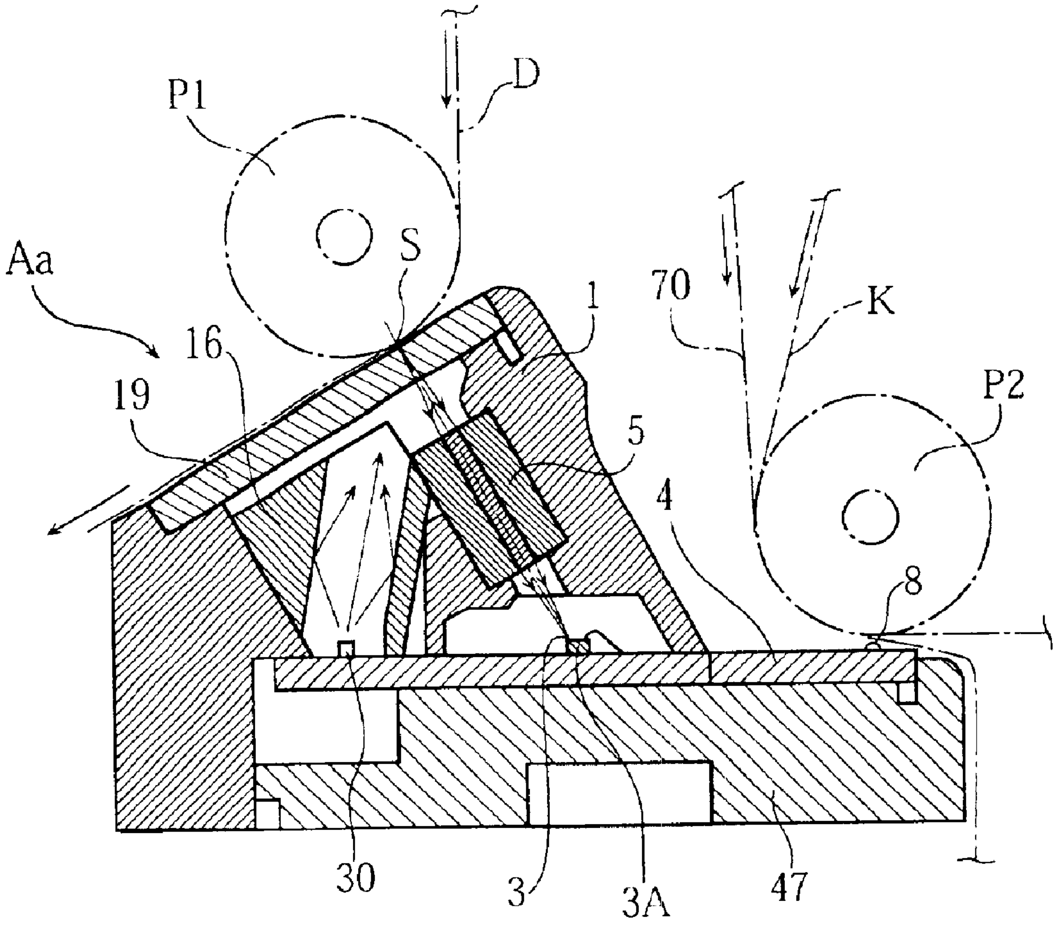
FIG. 7 is a sectional view showing a principal portion of another image read/write head in accordance with the present invention.

For example, the present invention may incorporate a modified image read/write head Aa, as shown in FIG. 7. In this figure, the elements which are identical or similar to those of the foregoing embodiment are designated by the same reference signs as those used for the foregoing embodiment.

The modified image read/write head Aa differs from the above-described image read/write head A in that a case 1 is made of a black synthetic resin, and a reflector 16 for guiding light emitted from the light sources 30 toward a image read line S is provided in the case 1. The reflector 16 includes highly reflective surfaces at portions for receiving light emitted from the light sources 30. Thus, the light from the light sources 30 can be efficiently guided toward the image read line S. Moreover, the case 1 has black surfaces having low light reflectivity, so that the light receiving elements 3 need not be covered with a black member.

Figure 8:
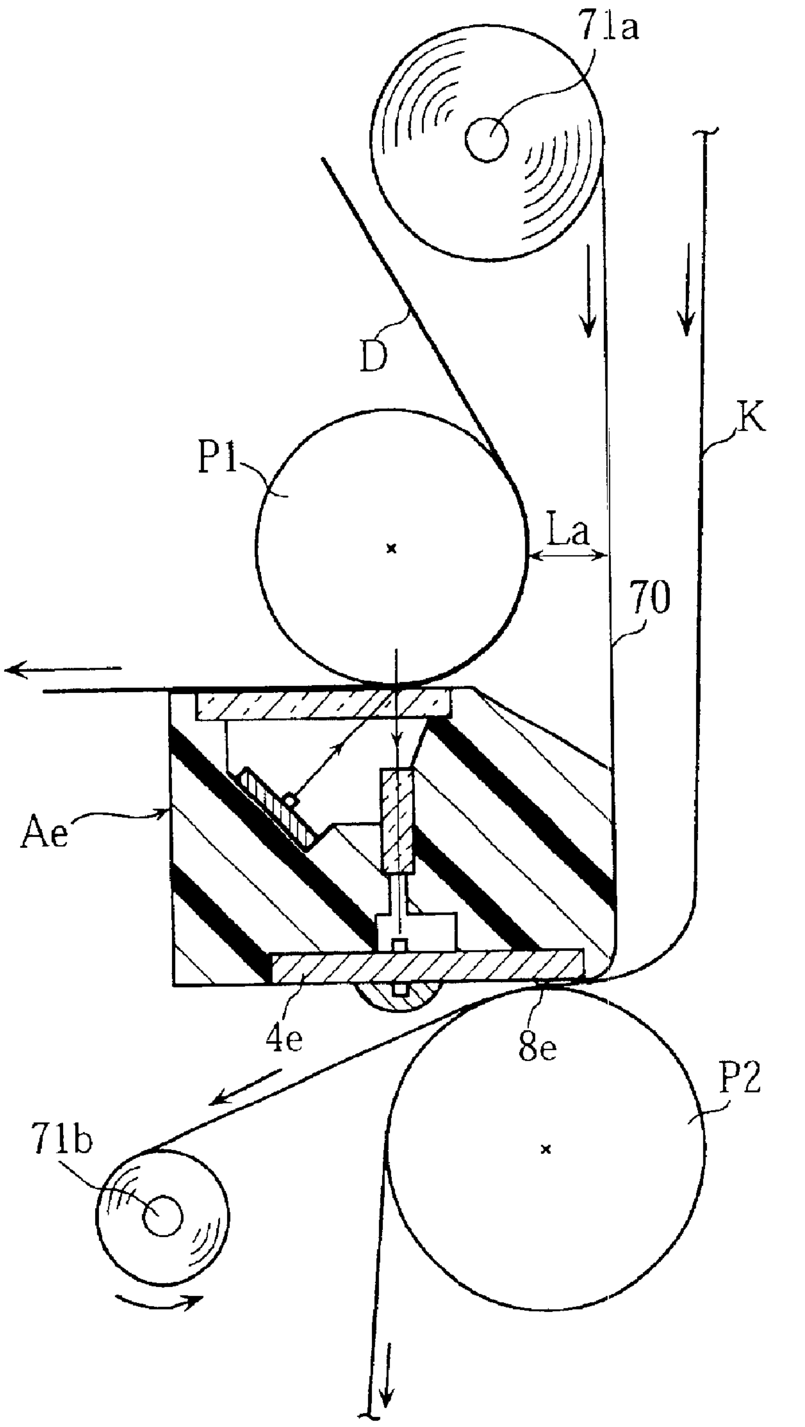
FIG. 8 is a sectional view showing a principal portion of another image processing apparatus in accordance with the present invention.
Figure 9:
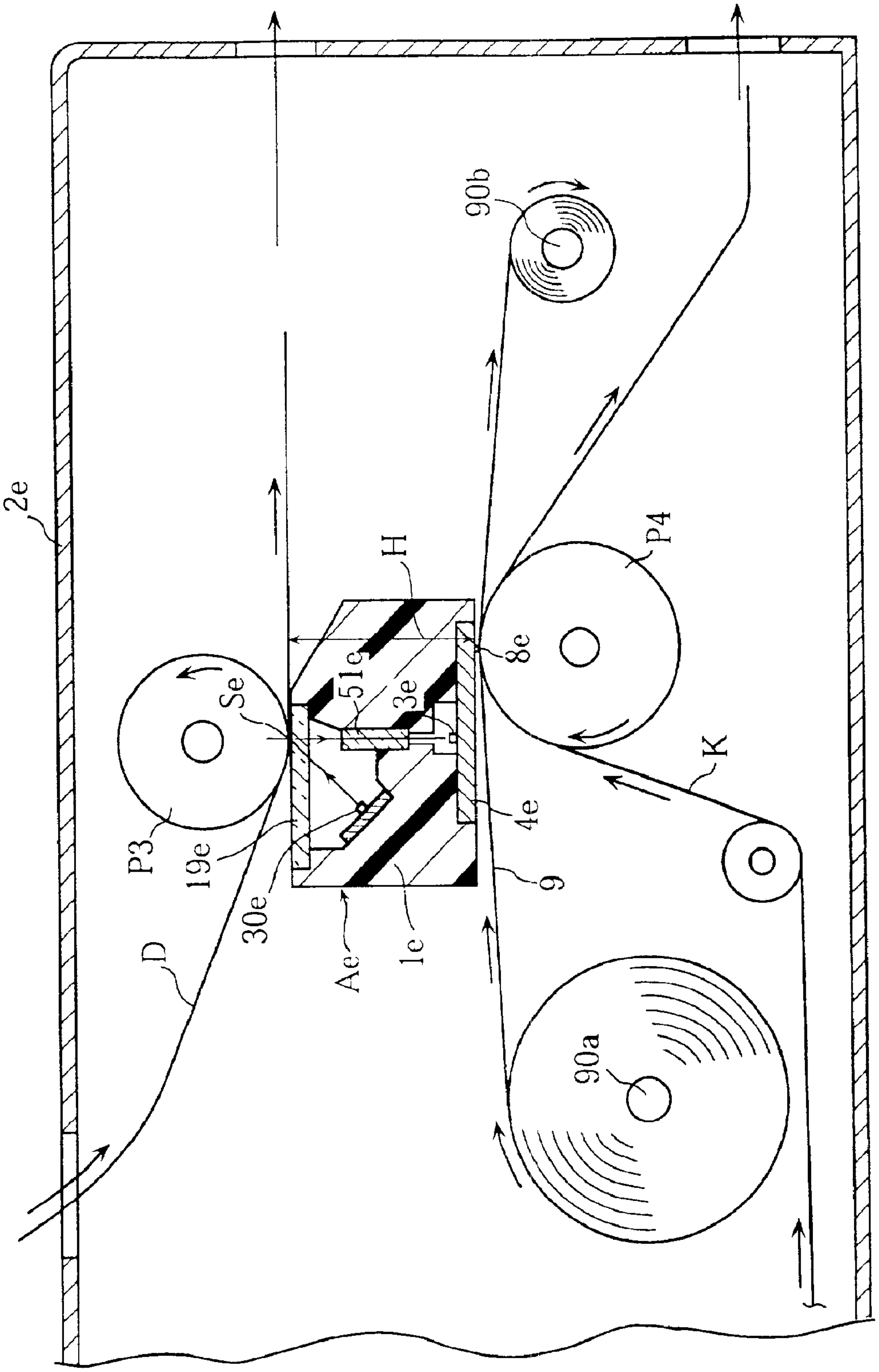
FIG. 9 PRIOR ART
FIG. 9 is a sectional view schematically showing an example of prior art image processing apparatus.

As shown in FIG. 8, the present invention may make use of a prior art image read/write head Aa. Also in this case, the winding cores 71*a*, 71*b* of an ink ribbon 70 are arranged above and below the substrate 4*e*, respectively, so that the transfer path of the ink ribbon 70 is made close to the transfer path of the document D to reduce the distance La between the two paths. Therefore, it is possible to reduce the thickness (dimension in the arrow La direction) of the image processing apparatus.

Each of the drive IC chips 80 may incorporate a group of light receiving elements in a common wafer chip. Further, instead of the LEDs, a cold cathode tube may be employed as a light source.

Regarding the arrangement of the pair of winding cores 71*a*, 71*b* for the ink ribbon 70, it is only necessary that the cores are arranged on the opposite sides of the image read/write head, as viewed thicknesswise of the substrate. Therefore, the image read/write head may be disposed at a position which is somewhat offset from a vertical line connecting the two winding cores.

Further, an ink ribbon and an image read/write head for read/write a monochrome image may be employed in the present invention. The present invention is also applicable to a so-called desktop type image processing apparatus. Further, the image processing apparatus in accordance with the present invention may be constructed as an apparatus other than a facsimile machine.

What is claimed:

1. An image processing apparatus comprising:

an image read/write head providing an image read line and including an image sensor for reading a document at the image read line, the image read/write head further including a substrate carrying a row of heating elements;

a document transfer mechanism for transferring the document across the image read line;

a recording paper transfer mechanism for transferring a recording paper across the row of heating elements; and an ink ribbon transfer mechanism for transferring an ink ribbon from a first winding core to a second winding core across the row of heating elements, the first winding core being rotatable for paying out the ink ribbon, the second winding core being rotatable for winding in the ink ribbon, the ink ribbon being sandwiched between the heating elements and the recording paper in passing across the row of heating elements;

wherein the first winding core is arranged on one side of the image read/write head thicknesswise of the substrate, the second winding core being arranged on an opposite side of the image read/write head thicknesswise of the substrate.

2. The image processing apparatus according to claim 1, wherein the recording paper transfer mechanism and the ink ribbon transfer mechanism transfer the recording paper and the ink ribbon, respectively, partially thicknesswise of the substrate and partially widthwise of the substrate.

3. The image processing apparatus according to claim 1, wherein the image read/write head includes a guide portion for guiding the document toward the image read line.

4. The image processing apparatus according to claim 1, wherein the first and second cores of the ink ribbon transfer mechanism overlaps the image read/write head widthwise of the substrate.

5. The image processing apparatus according to claim 1, wherein the recording paper is paid out from a roll thereof, the roll being disposed behind the first core of the ink ribbon transfer mechanism and overlapping the image read/write head widthwise of the substrate.

6. The image processing apparatus according to claim 1, wherein the recording paper is paid out from a roll thereof, the recording paper transfer mechanism including a platen roller for transferring the recording paper in facing relationship to the row of heating elements, the recording paper paid out from the roll being wound on the platen roller in a direction opposite to a direction in which the recording paper is initially wound on the roll.

7. The image processing apparatus according to claim 1, wherein the ink ribbon is a color ink ribbon including different kinds of color regions, wherein each of the color regions has a region width shorter than a length of a standard paper size which is determined based on a width of the ink ribbon.

8. The image processing apparatus according to claim 7, wherein the region width of each color region is equal to a quotient obtained by dividing the length of the standard paper size by an integer no less than 2.

9. The image processing apparatus according to claim 7, wherein the region width of each color region is equal to a sum of a quotient and a predetermined excess, the quotient being obtained by dividing the length of the standard paper size by an integer no less than 2.

10. The image processing apparatus according to claim 1, further comprising at least one light source for illuminating the document at the image read line, wherein the light source, the image sensor and the heating elements are mounted on a common surface of the substrate.

11. The image processing apparatus according to claim 1, further comprising a housing for accommodating the image read/write head, the document transfer mechanism, the recording paper transfer mechanism, the ink ribbon transfer mechanism and the recording paper, wherein the housing is provided with mounting means for mounting the housing onto a substantially vertical wall surface.

12. The image processing apparatus according to claim 1, further comprising a housing, wherein the housing includes a base portion and a cover pivotally connected to the base portion, wherein the image read/write head, the document transfer mechanism and the ink ribbon transfer mechanism are mounted on the cover of the housing, and wherein the recording paper transfer mechanism and the recording paper are mounted on the base portion of the housing.

13. An image processing apparatus comprising:

an image read/write head providing an image read line and including an image sensor for reading a document at the image read line, the image read/write head further including an elongated substrate carrying a row of heating elements;

a document transfer mechanism for transferring the document across the image read line;

a recording paper transfer mechanism for transferring a recording paper across the row of heating elements;

an ink ribbon transfer mechanism for transferring an ink ribbon from a first winding core to a second winding core across the row of heating elements, the first winding core being rotatable for paying out the ink ribbon, the second winding core being rotatable for winding in the ink ribbon, the ink ribbon being sandwiched between the heating elements and the recording paper in passing across the row of heating elements; and a housing for accommodating the image read/write head, the document transfer mechanism, the recording paper transfer mechanism and the ink ribbon transfer mechanism, the housing being mounted on a mounting wall surface;

wherein the image read/write head is disposed in the housing in such a manner that a widthwise direction of the substrate extends perpendicularly to the mounting wall surface.

* * * * *